US012691541B2

(12) United States Patent
Arnell et al.

(10) Patent No.: US 12,691,541 B2
(45) Date of Patent: Jul. 28, 2026

(54) ELECTRIC CUTTING TOOL

(71) Applicant: Globe (Jiangsu) Co., Ltd., Changzhou (CN)

(72) Inventors: Thomas Arnell, Huskvarna (SE); Haibin Wang, Changzhou (CN)

(73) Assignee: Giobe (Jiangsu) Co., Ltd., Changzhou (CN)

( * ) Notice: Subject to any disclaimer, the term of this patent is extended or adjusted under 35 U.S.C. 154(b) by 912 days.

(21) Appl. No.: 17/993,992

(22) Filed: Nov. 25, 2022

(65) Prior Publication Data

US 2023/0090978 A1 Mar. 23, 2023

Related U.S. Application Data

(63) Continuation of application No. PCT/CN2021/098254, filed on Jun. 4, 2021.

(30) Foreign Application Priority Data

| | | |
|---|---|---|
| Jun. 15, 2020 | (CN) | 202010543019.6 |
| Jun. 15, 2020 | (CN) | 202010543456.8 |
| Jun. 15, 2020 | (CN) | 202010544115.2 |
| Jun. 15, 2020 | (CN) | 202021100990.3 |

(51) Int. Cl.
    *B23Q 11/00* (2006.01)
    *B23D 59/00* (2006.01)
    *B25F 5/02* (2006.01)

(52) U.S. Cl.
    CPC ........ *B23Q 11/0064* (2013.01); *B23D 59/006* (2013.01); *B25F 5/02* (2013.01)

(58) Field of Classification Search
    CPC .............................. B23Q 11/0064; B25F 5/02
    See application file for complete search history.

(56) References Cited

U.S. PATENT DOCUMENTS

| | | | | |
|---|---|---|---|---|
| 7,832,499 | B2 * | 11/2010 | Komuro | B25F 5/008 173/171 |
| 10,173,311 | B2 * | 1/2019 | Takeda | B24B 23/02 |
| 2001/0030159 | A1 * | 10/2001 | Warren | B23Q 11/1069 210/695 |
| 2003/0106849 | A1 * | 6/2003 | Hirabayashi | B03C 1/12 210/243 |
| 2004/0040106 | A1 * | 3/2004 | Funk | B23Q 11/0064 15/104.001 |
| 2007/0193039 | A1 | 8/2007 | Onose | |
| 2009/0218113 | A1 * | 9/2009 | Johnen | B23Q 11/127 173/171 |
| 2010/0206278 | A1 | 8/2010 | Emmerich et al. | |

(Continued)

FOREIGN PATENT DOCUMENTS

| | | |
|---|---|---|
| CN | 2533972 Y | 2/2003 |
| CN | 202029117 U | 11/2011 |
| CN | 203722381 U | 7/2014 |

(Continued)

*Primary Examiner* — Omar Flores Sanchez

(57) ABSTRACT

The disclosure provides an electric cutting tool. The electric cutting tool includes a working assembly, a driving assembly and a housing. The driving assembly is connected with the working assembly and drives the working assembly to operate. At least part of the driving assembly is arranged inside the housing. The housing includes an inlet and a magnetic component arranged at the inlet.

19 Claims, 20 Drawing Sheets

(56)                    References Cited

U.S. PATENT DOCUMENTS

2023/0381875 A1*  11/2023  Li  ............................. B25F 5/02
2024/0149407 A1*   5/2024  Barezzani ........... B25B 23/1475

FOREIGN PATENT DOCUMENTS

| CN | 104943002 | A | 9/2015 |
|----|-----------|---|--------|
| CN | 205075028 | U | 3/2016 |
| CN | 105917988 | A | 9/2016 |
| CN | 108941728 | A | 12/2018 |
| CN | 208241462 | U | 12/2018 |
| CN | 208601153 | U | 3/2019 |
| CN | 110653766 | A | 1/2020 |
| CN | 212331457 | U | 1/2021 |
| CN | 212371306 | U | 1/2021 |
| JP | 11178282 | A | 7/1999 |
| WO | 2015107826 | A1 | 7/2015 |

* cited by examiner

100

202

202

ELECTRIC CUTTING TOOL

CROSS REFERENCE TO RELATED APPLICATION

The present application is a continuation application of PCT application filing PCT/CN2021/098254 filed on Jun. 4, 2021, which claims the benefit of CN 202021100990.3 filed on Jun. 15, 2020, CN 202010543456.8 filed on Jun. 15, 2020, CN 202010544115.2 filed on Jun. 15, 2020, and CN 202010543019.6 filed on Jun. 15, 2020. All the above are hereby incorporated by reference, including any appendices or attachments thereof, for all purposes.

TECHNICAL FIELD

The disclosure belongs to the field of electric tools, and particularly relates to an electric cutting tool.

BACKGROUND

The cutting saw is a cutting tool powered by electricity, gasoline, etc. It is usually used to cut wood, stone, steel, concrete, etc., which effectively saves the time, labor, etc. for cutting materials, thereby improving the work efficiency of the user. However, when the conventional cutting saw cuts concrete, a large amount of abrasive residues, such as concrete residues, metal residues, etc., are generated. If these abrasive residues are sucked into the cutting saw, it will cause damage to the prime motor, control circuit board, etc. located inside the cutting saw, and even cause the cutting saw to malfunction, which disables the cutting saw to function normally.

SUMMARY

The disclosure provides an electric cutting tool. The electric cutting tool includes a working assembly, a driving assembly and a housing. The driving assembly is connected with the working assembly and drives the working assembly to operate. At least part of the driving assembly is arranged inside the housing. The housing includes an inlet and a magnetic component arranged at the inlet.

In summary, the disclosure provides an electric cutting tool. The electric cutting tool is provided with the magnetic component at the inlet to absorb metal residue in the air, thereby effectively preventing the metal residue from entering an interior of the electric cutting tool, preventing the metal residue from damaging a prime motor, a control circuit board, etc., which effectively increases a duration life of the electric cutting tool.

DETAILED DESCRIPTION

The technical solutions in the embodiments of the disclosure will be clearly and completely described below with reference to the accompanying figures in the embodiments of the disclosure. Obviously, the described embodiments are only some, but not all embodiments of the disclosure. Based on the embodiments of the disclosure, all other embodiments obtained by those of ordinary skill in the art without creative efforts shall fall within the scope of the disclosure.

It should be noted that figures provided in these embodiments only illustrate a basic idea of the disclosure in a schematic manner. The figures only show the assemblies related to the disclosure instead of drawing according to number, shape and size of the assemblies in actual implementation. In its actual implementation, type, quantity, and ratio of each assembly may be changed at will, and its assembly layout type may also be more complicated.

Figure 1:
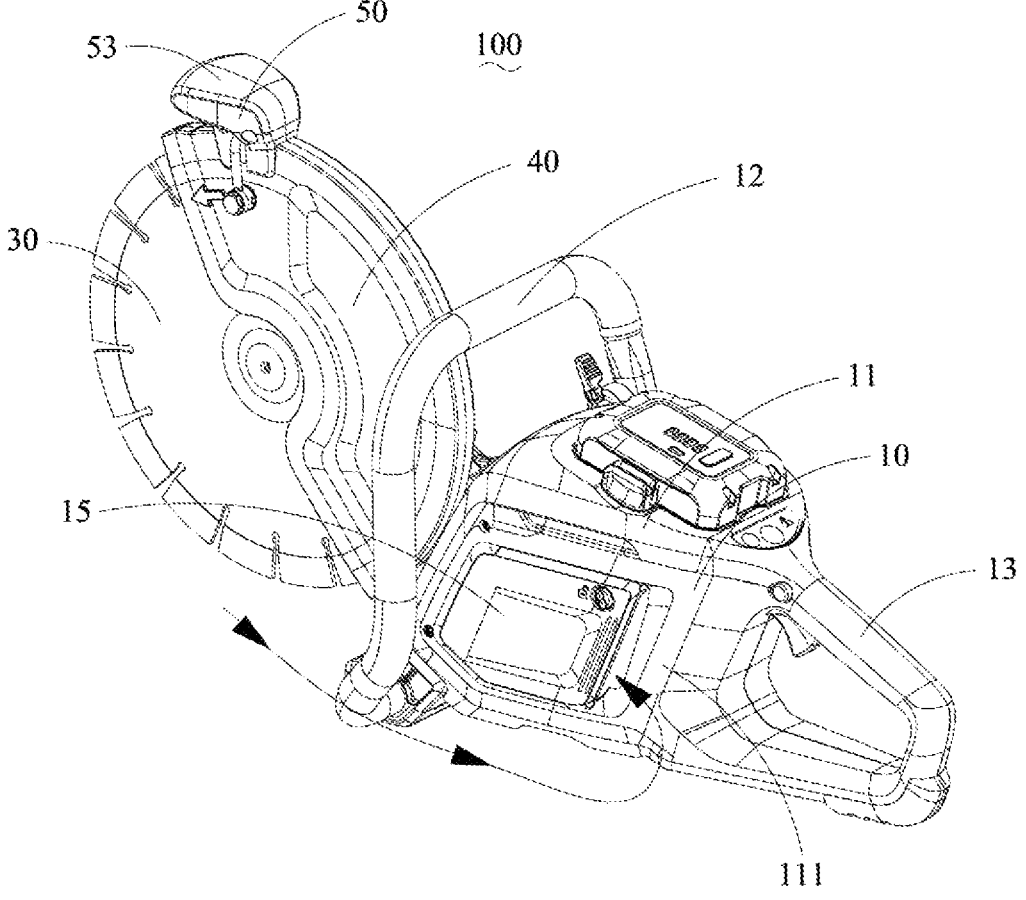
FIG. 1 is a perspective schematic view of an electric cutting tool according to an embodiment of the disclosure.
Figure 2:
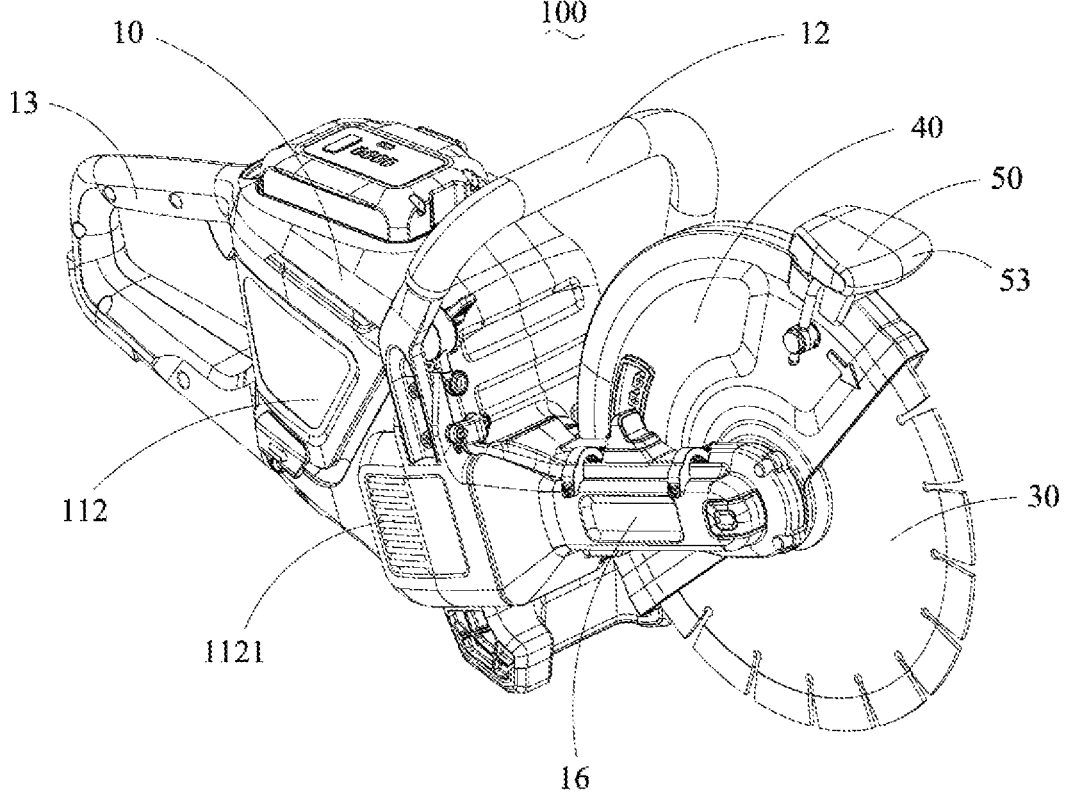
FIG. 2 is a perspective schematic view of the electric cutting tool shown in FIG. 1 from another angle.
Figure 3:
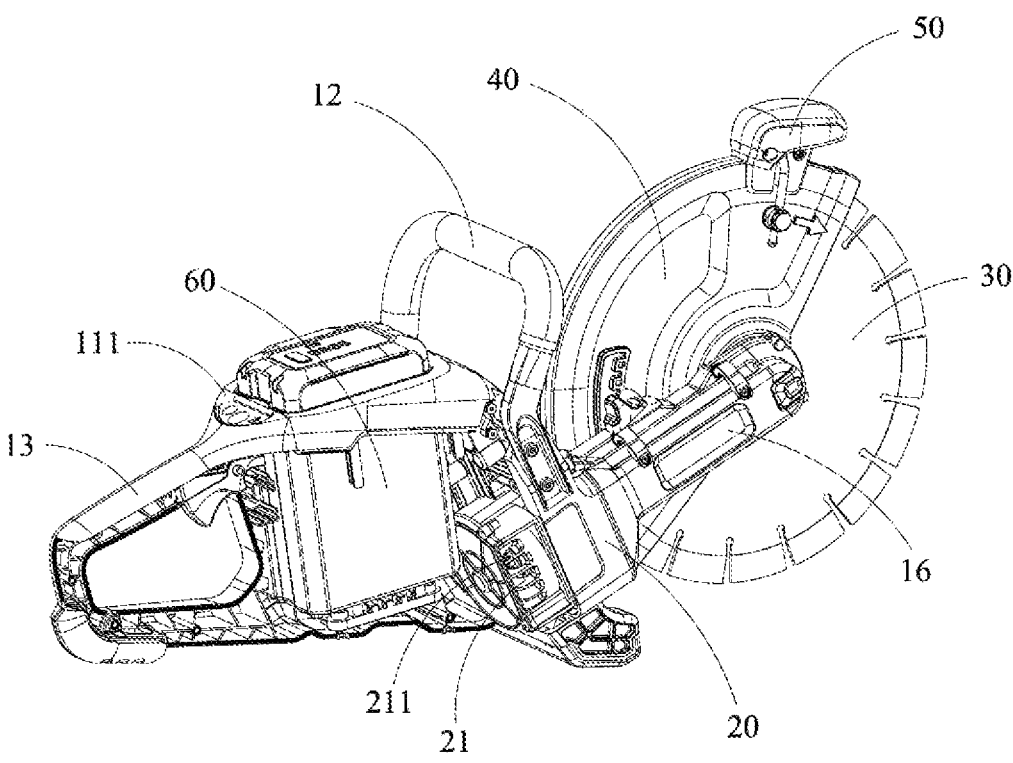
FIG. 3 is a perspective schematic view of the electric cutting tool shown in FIG. 1 after removing a second housing.
Figure 4:
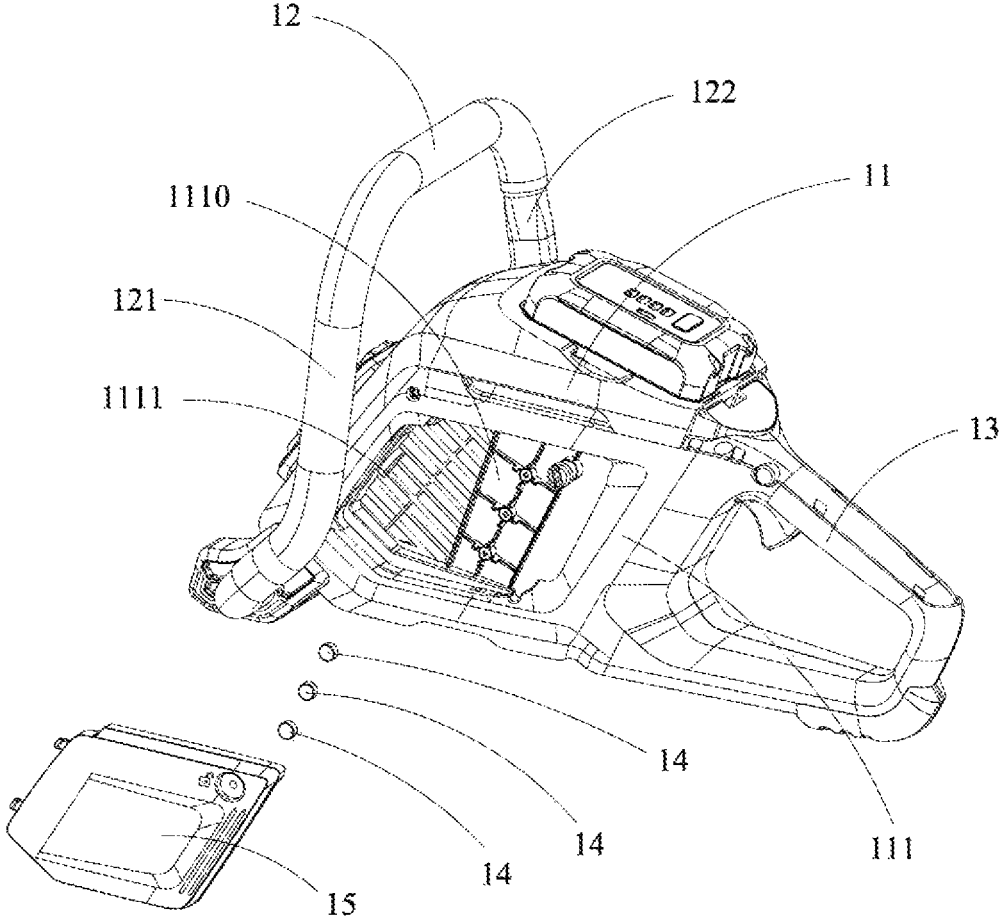
FIG. 4 is an exploded perspective view of a casing.

Please refer to FIG. 1 through FIG. 3. The disclosure provides an electric cutting tool 100. The electric cutting tool includes a casing 10, a driving assembly 20, a saw blade 30, a shield assembly 40, a lighting assembly 50 and a power supply assembly 60. The driving assembly 20 is mounted on the casing 10. The saw blade 30 is matched with the driving assembly 20. The shield assembly 40 is matched with the saw blade 30.

Please refer to FIG. 1 through FIG. 4. The casing 10 includes a housing 11, an auxiliary handle 12, a main handle 13, a magnetic component 14, an inlet cover 15 and a mounting arm 16. The auxiliary handle 12 is arranged at a front end of the housing 11. The main handle 13 is arranged at a rear end of the housing 11. The magnetic component 14 is mounted on the housing 11. The mounting arm 16 is located at the front end of the housing 11. Please refer to FIG. 5, the housing 11 includes a first housing 111, a second housing 112 arranged opposite to the first housing 111 and an accommodating cavity 113. The accommodating cavity 113 is formed by the first housing 111 and the second housing 112 together.

Figure 6:
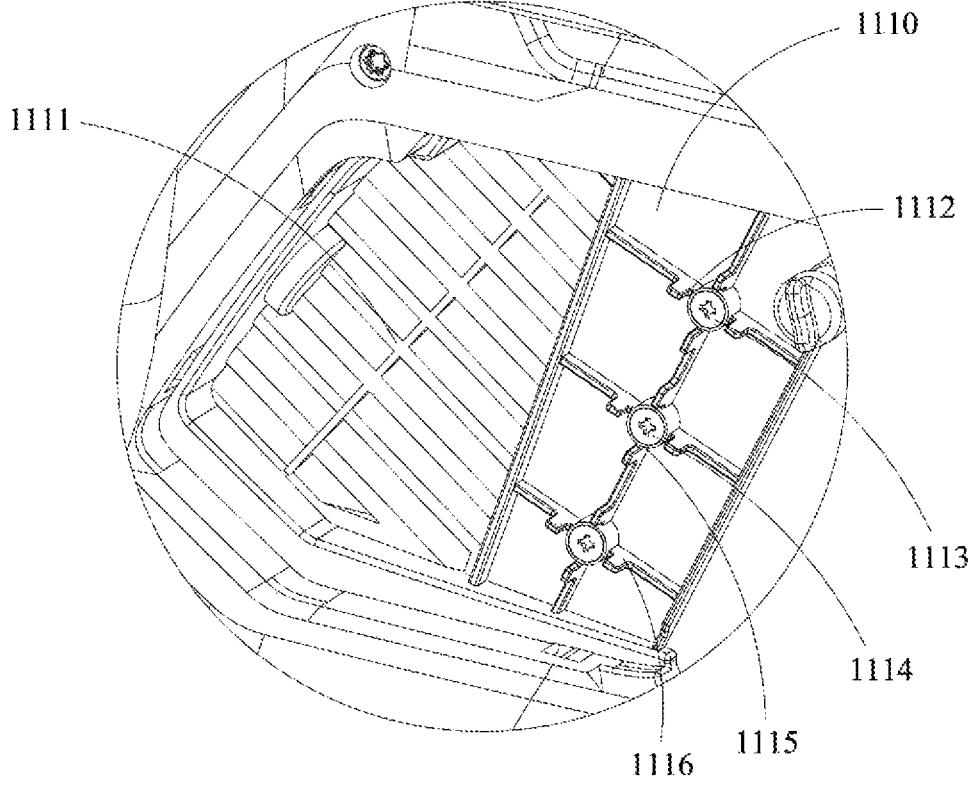
FIG. 6 is a partial enlarged schematic view at an inlet shown in FIG. 4.
Figure 7:
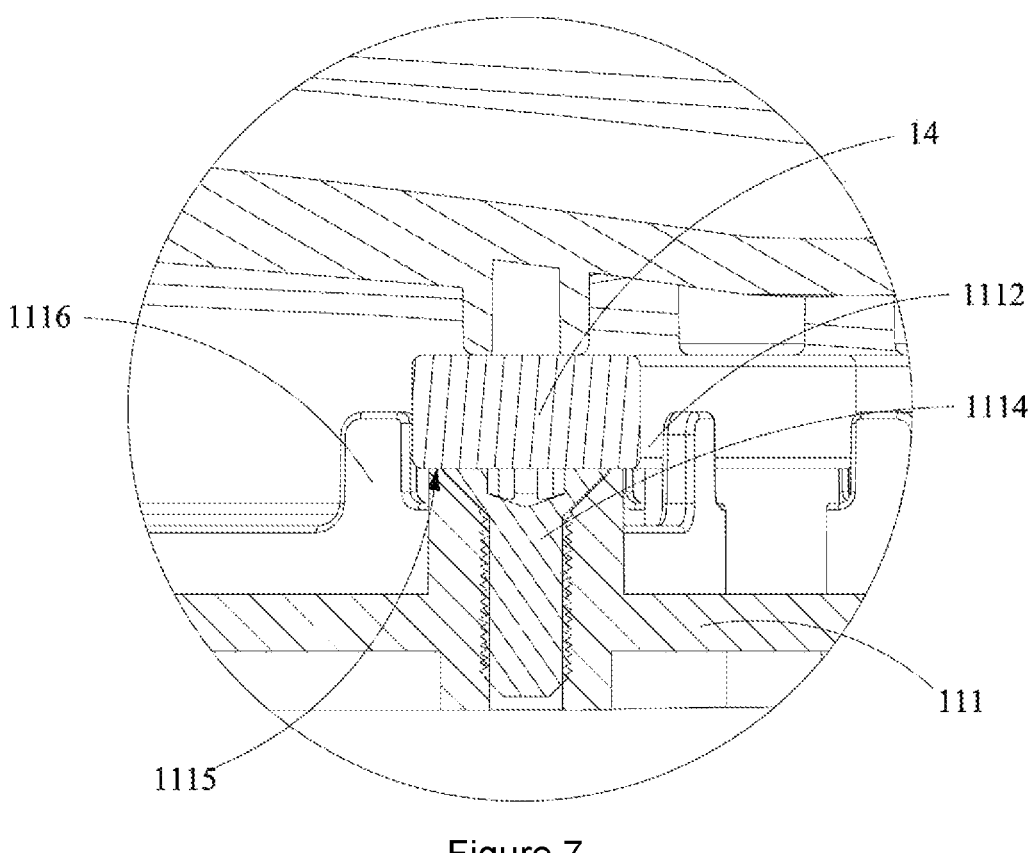
FIG. 7 is a partial enlarged schematic view of FIG. 5.

Please refer to FIG. 6 and FIG. 7. The first housing 111 is provided with a groove 1110, an inlet 1111, a fixing groove 1112 and a ferromagnetic component 1113. The groove 1110 is formed inwardly from a side of the first housing 111 facing away from the accommodating cavity 113. The inlet 1111 is arranged on a bottom wall of the groove 1110 so that outside air can enter the accommodating cavity 113 from the inlet 1111. The fixing groove 1112 is arranged on the bottom wall of the groove 1110 and is located on a side of the inlet 1111 away from the saw blade 30. The fixing groove 1112 is matched with the magnetic component 14 to fix the magnetic component 14. In this embodiment, the bottom wall of the groove 1110 protrudes upward to form a plurality of reinforcing ribs 1116 to enhance a strength of the bottom wall of the groove 1110. The fixing groove 1112 is formed by the reinforcing ribs 1116. With this arrangement, a storage space for metal residues may be made available without reducing a strength of the first housing 111, and at the same time, an overall volume of the housing 11 will not be increased. In this embodiment, the fixing groove 1112 is formed by four reinforcing ribs 1116. However, it should be understood that, in other embodiments, the number of the reinforcing ribs 1116 forming the fixing groove 1112 may be set as required. The ferromagnetic component 1113 is arranged inside the fixing groove 1112 to fix the magnetic component 14, and the ferromagnetic component 1113 is fixedly mounted on the first housing 111. The magnetic component 14 is adsorbed and fixed on the ferromagnetic component 1113. This arrangement not only facilitates a mounting of the magnetic component 14, but also facilitates a user to disassemble the magnetic component 14, so as to facilitate the user to remove the metal residues adsorbed on the magnetic component 14. In this embodiment, the ferromagnetic component 1113 is a self-tapping screw 1114. A head of the self-tapping screw 1114 is flat.

Please refer to FIG. 7. After the self-tapping screw 1114 is fixedly mounted in the fixing groove 1112, the head of the self-tapping screw 1114 is flush with a peripheral housing 1115 of the self-tapping screw, so that the magnetic component 14 and the head of the self-tapping screw 1114 has a largest contact area, which enables the magnetic component 14 to be firmly adsorbed and fixed on the self-tapping screw 1114. Of course, the ferromagnetic component 1113 may also be an iron sheet, a cobalt sheet, or the like. Please refer to FIG. 2. The second housing 112 is provided with an outlet 1121 matched with the inlet 1111, so that the air in the accommodating cavity 113 may be discharged from the outlet 1121. In this embodiment, the inlet 1111 and the outlet 1121 are both louvered air outlets. However, in other embodiments, styles of the inlet 1111 and the outlet 1121 may be set as required, which is not limited in the disclosure. The accommodating cavity 113 is configured for housing the driving assembly 20 and the power supply assembly 60. The auxiliary handle 12 is arranged at the front end of the housing 11 and is substantially U-shaped, one end of the auxiliary handle 12 is fixedly mounted on the first housing 111 and the other end is fixedly mounted on the second housing 112. The main handle 13 is arranged at the rear end of the housing 11 and is matched with the auxiliary handle 12 so that the user may hold the main handle 13 with one hand and the auxiliary handle 13 with the other hand, which allows the user to better handle the electric cutting tool 100. The magnetic component 14 is fixedly mounted on a side edge of the inlet 1111, and is located on a side of the first housing 111 away from the accommodating cavity 113. Since the electric cutting tool 100 will generate metal residue particles when cutting metal and reinforced concrete, these metal residue particles will be sucked into the housing 11 of the electric cutting tool 100 along airflow, thereby damaging a motor and control circuit board. etc., which affects a duration life of the electric cutting tool 100. Since the magnetic component 14 is arranged on the side edge of the inlet 1111, it is convenient for the magnetic component 14 to adsorb metal residues in the wind entering the inlet 1111, thereby effectively preventing metal residue particles from entering the housing 11 and damaging the motor, the control circuit board, etc., which effectively improves the duration life of the electric cutting tool 100.

Figure 5:
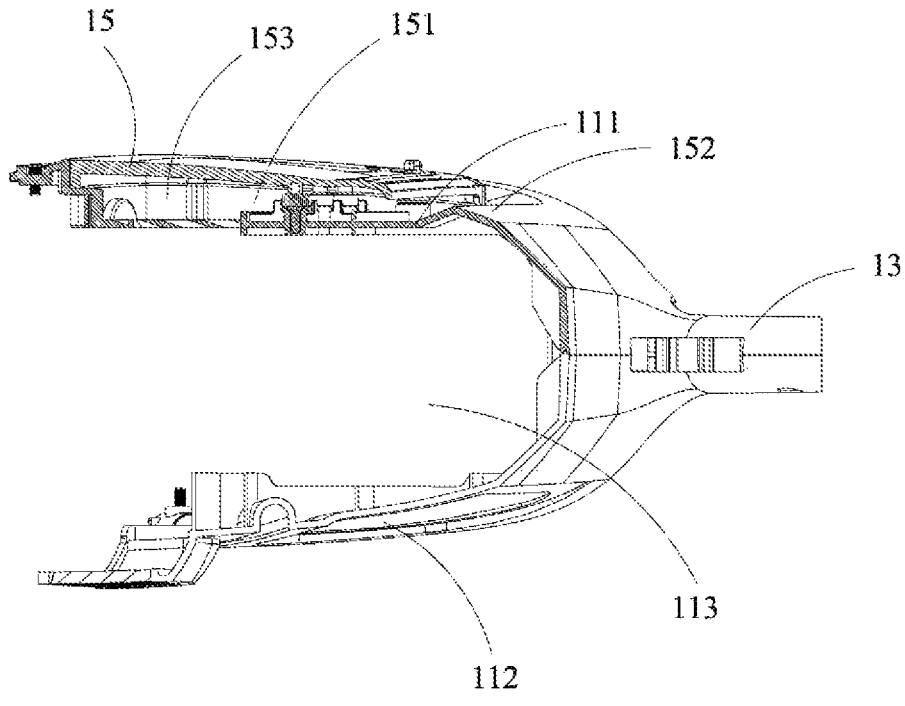
FIG. 5 is a schematic cross-sectional view of a housing, a magnetic component, and an inlet cover after assembled.
Figure 8:
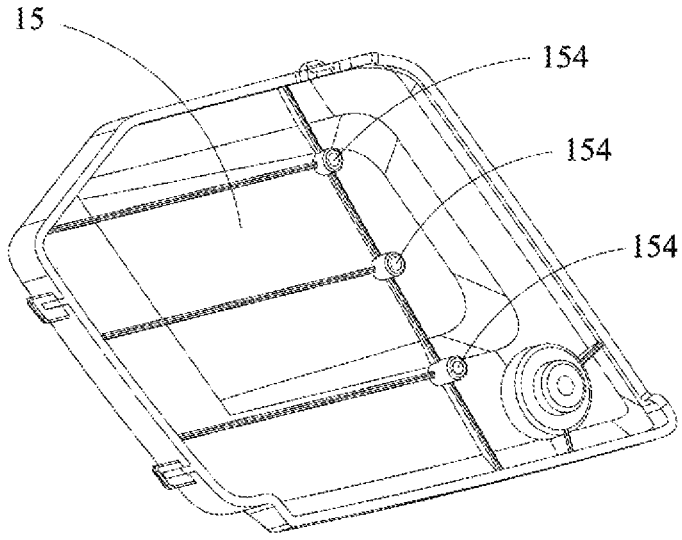
FIG. 8 is a perspective schematic view of the inlet cover.

Please refer to FIG. 1, FIG. 5 and FIG. 8. The inlet cover 15 is matched with the inlet 1111 and is detachably mounted on the first housing 111. An inlet passage 151 is formed between the inlet cover 15 and the first housing 111. The inlet passage 151 includes an inlet end 152 that communicates with outside and an outlet end 153 that communicates with the inlet 1111. The magnetic component 14 is located between the inlet end 152 and the outlet end 153. The inlet end 151 is located on a side of the inlet cover 15 away from the saw blade 30. With this arrangement, metal residues, dust particles, water droplets, etc. must be turned 180 degrees before entering the housing 11 (as shown by an arrow line in FIG. 1), thereby greatly reducing a risk of metal residues, dust particles, water droplets, etc. being sucked into the housing 11, which effectively increases the duration life of the electric cutting tool 100. In this embodiment, the inlet passage 151 is substantially linear. However, in other embodiments, the inlet passage 151 may also be configured in a spiral shape, so as to further filter out metal residues, dust particles, water droplets, etc. in the wind by centrifugal force. A side of the inlet cover 15 facing the magnetic component 14 is further provided with a positioning column 154 abutting against the magnetic component 14 to assist in fixing the magnetic component 14.

Please refer to FIG. 1, FIG. 5 and FIG. 8. The magnetic component 14 is arranged on one side of the inlet 1111. However, in other embodiments, the magnetic component 14 may also be arranged along a periphery of the inlet 1111. In this embodiment, the magnetic component 14 is arranged on the bottom wall of the groove 1110. However, in other embodiments, the magnetic component 14 may also be arranged on a sidewall of the groove 1110. In this embodiment, the magnetic component 14 is a magnet. However, in other embodiments, the magnetic component 14 may also be an electromagnetic coil. In this embodiment, the magnetic component 14 is fixedly mounted on the first housing 111. However, in other embodiments, the magnetic component 14 may also be fixedly mounted on a side of the inlet cover 15 facing the inlet 1111.

Please refer to FIG. 3. The driving assembly 20 is configured to drive the saw blade 30 to operate, so that the saw blade 30 realizes a cutting function of the electric cutting tool 100. The driving assembly 20 is at least partially located in the accommodating cavity 113, and includes a prime motor 21 mounted in the accommodating cavity 113 and an output shaft assembly (not shown) matched with the prime motor 21. In this embodiment, the prime motor 21 is an electric motor. However, in other embodiments, the prime motor 21 may also be other machines, such as gasoline engines and the like. The prime motor 21 is provided with a cooling blade 211 so as to absorb the outside air during an operation of the prime motor 21, so that the air enters from the inlet 1111 and is discharged from the outlet 1121, which cools the prime motor 21. The output shaft assembly is configured to drive the saw blade 30 to operate. The saw blade 30 is pivotally mounted on the mounting arm 16. In this embodiment, the saw blade 30 is circular. However, in other embodiments, the saw blade 30 may be a rectangular saw blade or a chain saw. This embodiment does not limit a specific form of the saw blade 30. In this embodiment, the driving assembly 20 is partially located in the accommodating cavity 113. However, in other embodiments, all of the driving assembly 20 may also be arranged in the accommodating cavity 113.

Figure 9:
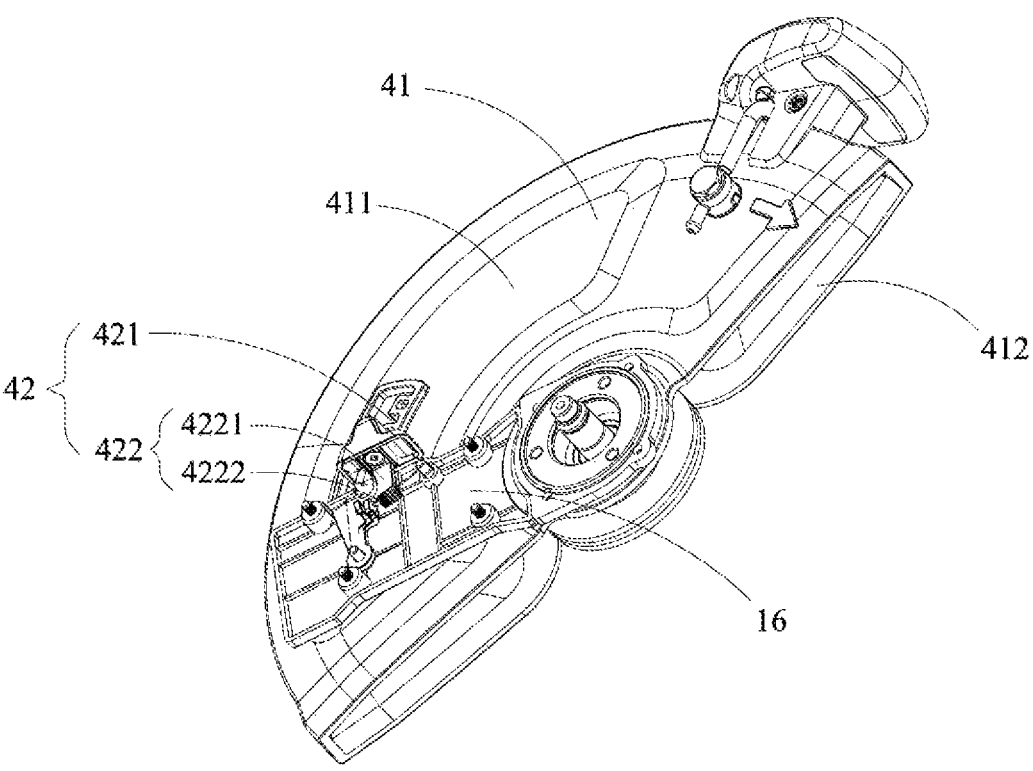
FIG. 9 is a perspective schematic view of a shield assembly and a lighting assembly.
Figure 10:
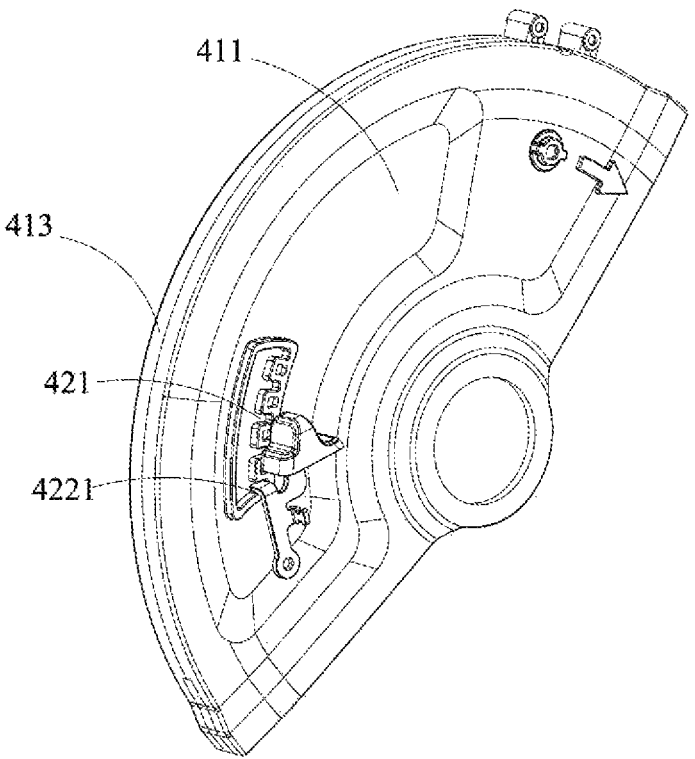
FIG. 10 is a perspective schematic view of the shield assembly shown in FIG. 9.
Figure 11:
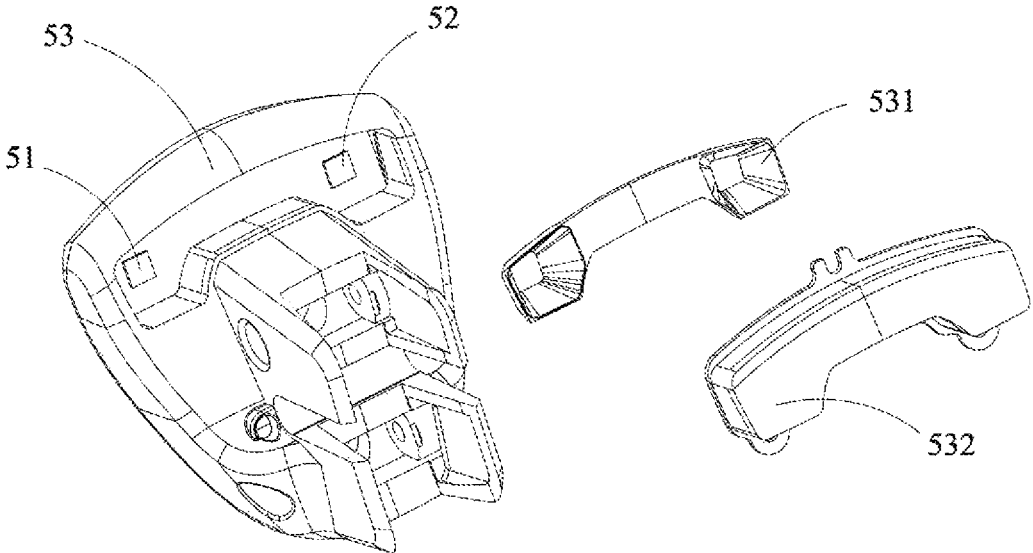
FIG. 11 is a perspective exploded view of the lighting assembly.
Figure 12:
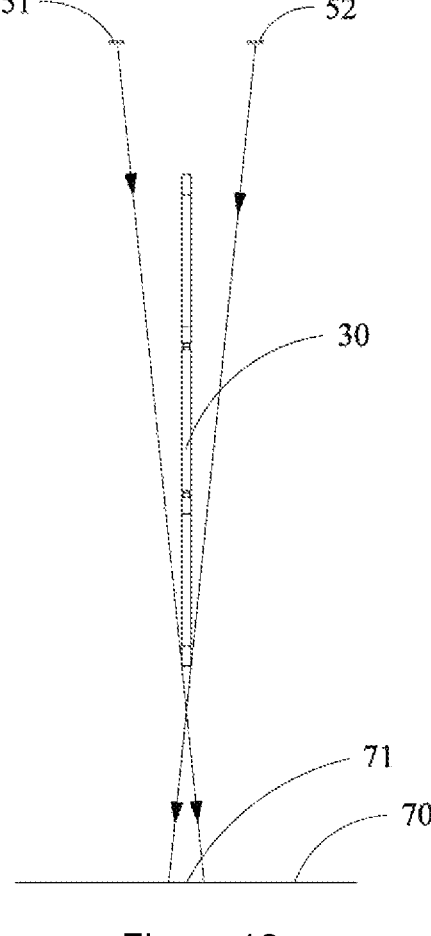
FIG. 12 is a schematic view showing a relationship between a light emitted by a first lighting lamp and a second lighting lamp and a saw blade.

Please refer to FIG. 9 and FIG. 10. The shield assembly 40 includes a shield 41 and a positioning mechanism 42 matched with the shield 41. The shield 41 is located at least partially above the saw blade 30 and surrounds at least a part of the saw blade 30 to prevent metal residues, concrete residues, etc. generated during a cutting process from splashing and hurting people. The shield 41 is pivotally mounted on the mounting arm 16, so that the shield 41 may rotate around the mounting arm 16, so as to facilitate the user to adjust a position of the shield 41 as required. The shield 41 includes a first protective wall 411, a second protective wall 412 arranged in parallel with the saw blade 30, and a connecting wall 413 connecting the first protective wall 411 and the second protective wall 412. The first protective wall 411 and the second protective wall 412 are located on both sides of the saw blade 30. The positioning mechanism 42 includes a first positioning component 421 arranged on the first protective wall 411 and a second positioning component 422 pivotally mounted on the mounting arm 16. The first positioning component 421 is matched with the second positioning component 422 to fix the shield 41. In this embodiment, the first positioning component 421 is provided with several positioning grooves. The second positioning component 422 includes a push button 4221 pivotally mounted on the mounting arm 16 and matched with the positioning groove, and an elastic component 4222 matched with the push button 4221. One end of the elastic component 4222 is fixedly mounted on the push button 4221, and the other end of the elastic component 4222 is fixedly mounted on the mounting arm 16. When in use, the push button 4221 is pushed first, so that the push button 4221 is out of contact with the positioning groove, and the elastic component 4222 is elastically deformed under an action of the push button 4221. At this time, the shield 41 may be rotated to adjust a relative positional relationship between the shield 41 and the mounting arm 16. Then, the push button 4221 is released. At this time, the push button 4221 is reset under an action of the elastic component 4222 and is matched with the positioning groove to fix the shield 41.

Please refer to FIG. 1, FIG. 2, FIG. 11 and FIG. 12. The lighting assembly 50 is used to illuminate an area to be cut 70, and includes a first lighting lamp 51, a second lighting lamp 52 and a lamp base 53. The first lighting lamp 51 and the second lighting lamp 52 are respectively located on both sides of a plane where the saw blade 30 is located, so that a light emitted by the first lighting lamp 51 and a light emitted by the second lighting lamp 52 form an overlapping area 71 directly below the saw blade 30, so as to achieve a double-light effect, which effectively illuminates a cutting line, avoids shadows caused by a light irradiation on one side, and thus facilitates the user to cut. The first lighting lamp 51 and the second lighting lamp 52 are LED lamps, which are fixedly mounted on both ends of the lamp base 53. The lamp base 53 is straddled and fixed on the connecting wall 413, so that the first lighting lamp 51 and the second lighting lamp 52 are respectively located on both sides of the plane where the saw blade 30 is located. The lamp base 53 is further provided with a reflector 531 and a dust cover 532 matched with the first lighting lamp 51 and the second lighting lamp 52. In this embodiment, the first lighting lamp 51 and the second lighting lamp 52 are fixedly mounted on the shield 41 through the lamp base 53. However, in other embodiments, the first lighting lamp 51 and the second lighting lamp 52 may also be fixedly mounted on the auxiliary handle 12. Please refer to FIG. 4. The auxiliary handle 12 includes a first part 121 located on one side of the plane where the saw blade 30 is located and a second part 122 located on the other side of the plane where the saw blade 30 is located. The first lighting lamp 51 is fixedly mounted on the first part 121, and the second lighting lamp 52 is fixedly mounted on the second part 122. With this arrangement, the double-light effect may also be achieved. The electric cutting tool 100 is further provided with a spiral telescopic wire (not shown), one end of the spiral telescopic wire is connected with the lighting assembly 50, and the other end of the spiral telescopic wire is connected with the power supply assembly 60, so that the power supply assembly 60 may supply power to the lighting assembly 50. The power supply assembly 60 is further used to supply power to the driving assembly 20. In this embodiment, the power supply assembly 60 is a single-voltage battery pack. Of course, the power supply assembly 60 may also be a multi-voltage battery pack. With this arrangement, multiple electric tools may share the same battery pack, thereby facilitating the user to maintain the battery pack and reducing a cost.

Please refer to FIG. 1. The electric cutting tool 100 of the disclosure is provided with the magnetic component 14 at the inlet 1111 to absorb the metal residues in air intake, thereby effectively preventing the metal residues from entering the electric cutting tool 100 and preventing the metal residues from damaging the prime motor 21, control circuit boards, etc., which effectively improves the duration life of the electric cutting tool 100.

Figure 13:
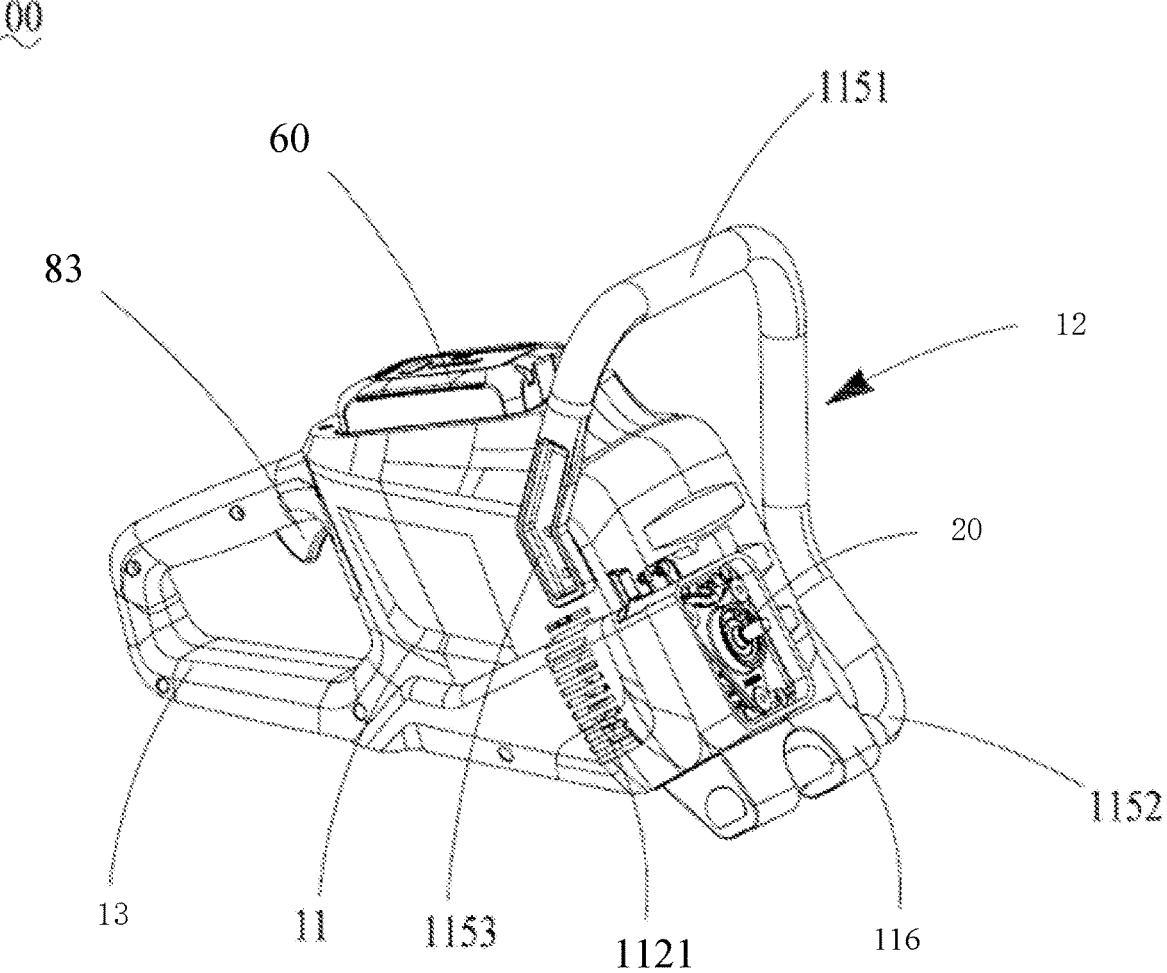
FIG. 13 is a perspective schematic view of the electric cutting tool of the disclosure without a working assembly.
Figure 18:
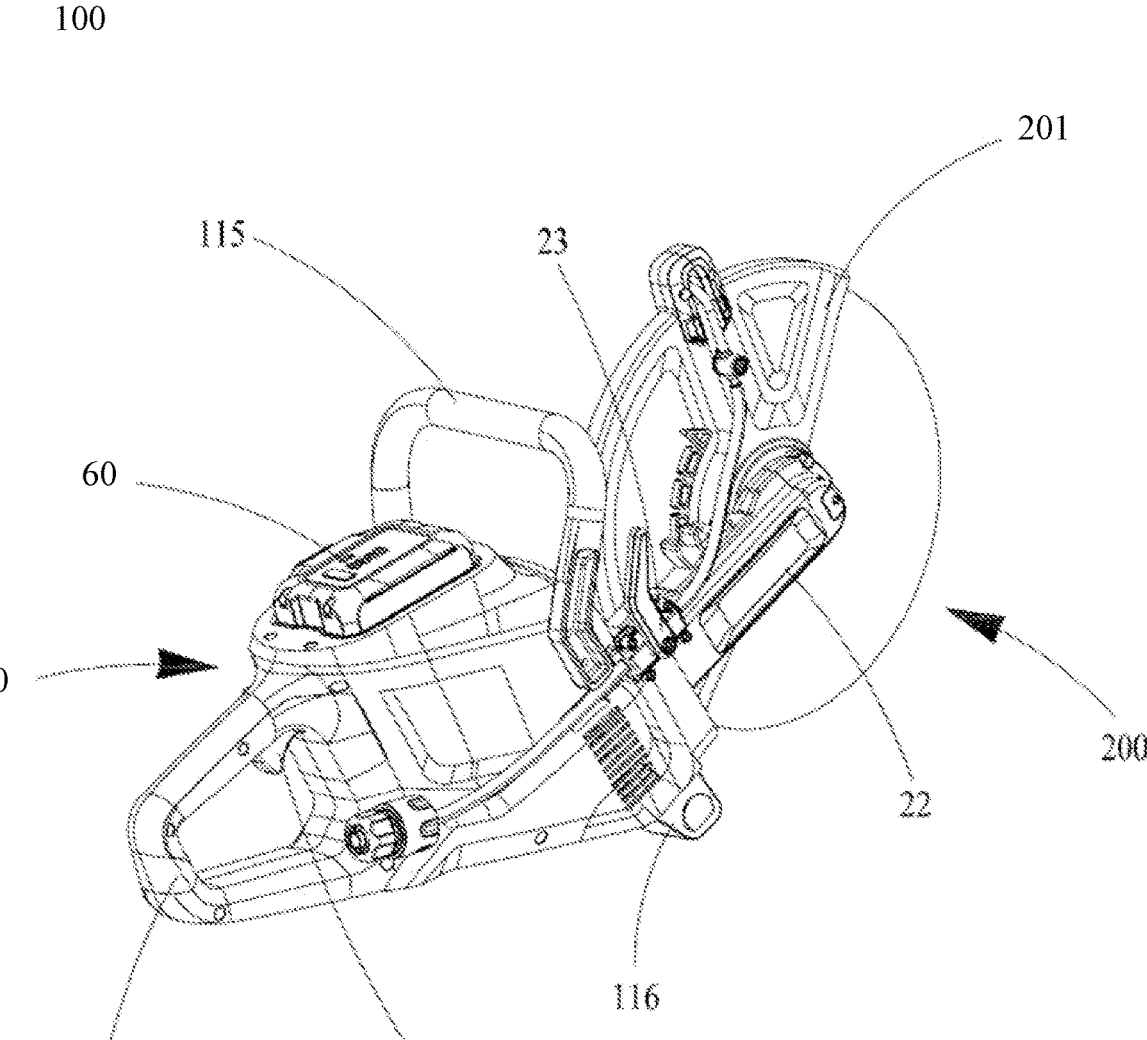
FIG. 18 is a perspective schematic view of the electric cutting tool according to an embodiment of the disclosure.

Please refer to FIG. 13 and FIG. 18. The electric cutting tool 100 is provided with a detachable working assembly 200. The electric cutting tool 100 includes the housing 11, the driving assembly 20 and the power supply assembly 60. The driving assembly 20 and the power supply assembly 60 are housed in the housing 11.

Figure 14:
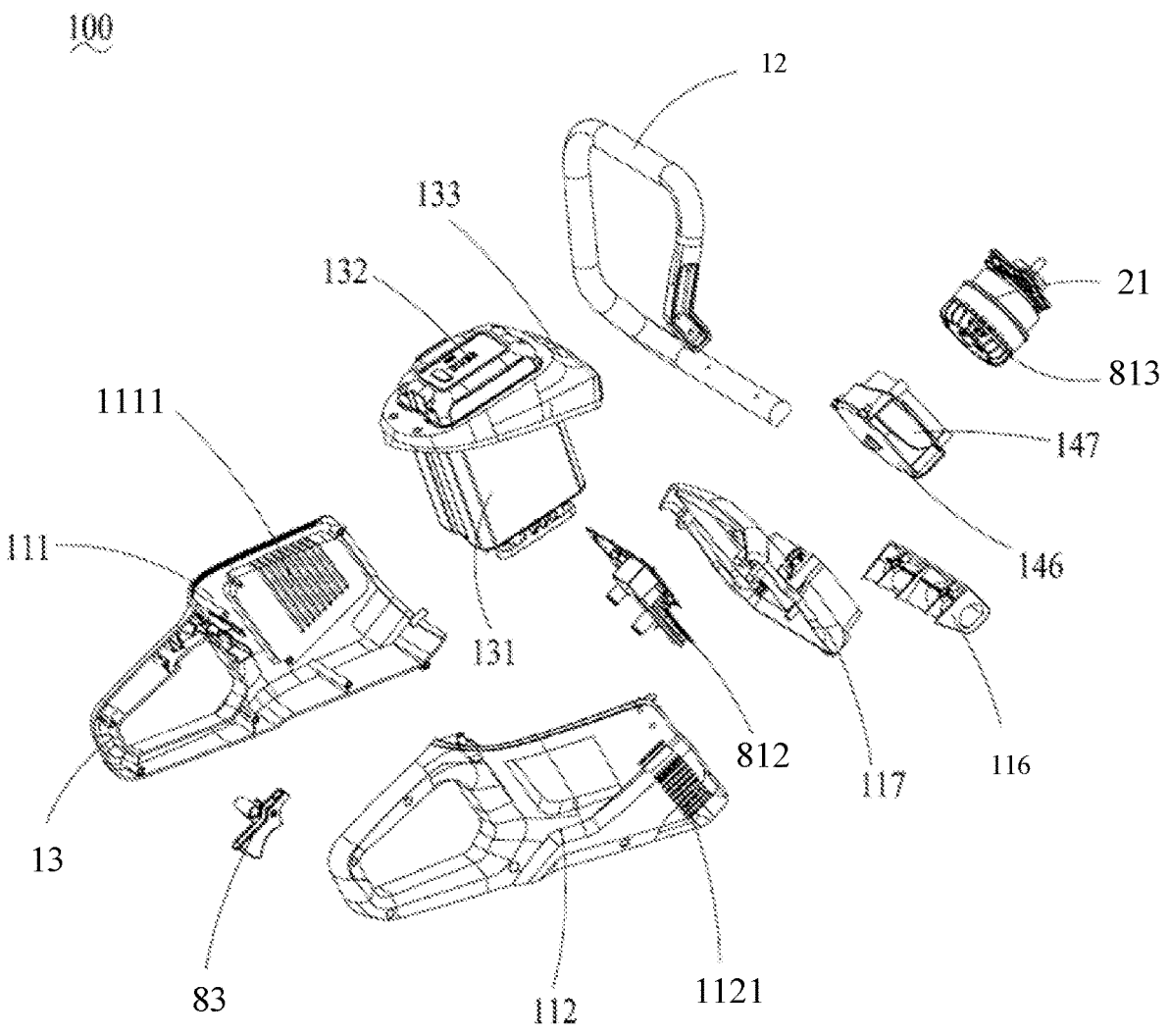
FIG. 14 is a disassembled schematic view of FIG. 13.

Please refer to FIG. 13 and FIG. 14. A longitudinal extension direction of the housing 11 is defined as a positive direction, an end of the housing for connecting and fixing the working assembly 200 (as shown in FIG. 18) is a front end, and an end away from the working assembly 200 is a rear end. The first housing 111 and the second housing 112 are arranged to be clamped with each other. The housing 11 further includes the main handle 13 arranged at its rear end. In an embodiment of the disclosure, the main handle 13 is formed by surrounding the first housing 111 and the second housing 112, which means that the main handle 13 is integrally formed with the housing 11. This arrangement, on the one hand, enhances a stability of a connection between the main handle 13 and the housing 11. On the other hand, production steps and processes of the housing 11 are simplified, and a purpose of reducing a production cost is achieved. Of course, in other embodiments of the disclosure, the main handle 13 may also be separately formed on the first housing 111 and/or the second housing 112. Alternatively, the main handle 13 may also be arranged separately from the housing 11, and it is only necessary to ensure the stability of the connection between the main handle 13 and the housing 11. The auxiliary handle 12 is detachably connected with the housing 11. The auxiliary handle 12 is provided with a holding part 1151 arranged in an arch shape, and a first fixing part 1152 and a second fixing part 1153 respectively located at both ends of the holding part 1151. The holding part 1151 extends from one end of the first fixing part 1152 in a direction away from the second housing 12 and is arranged around the first housing 111. With this arrangement, the first housing 111 is surrounded and protected by the holding part 151, which effectively prevents the first housing 111 from colliding with the outside, thereby simplifying a strengthening structure or setting thickness of the first housing 111. A production cost of the first housing 111 is further reduced, and the purpose of reducing the production cost is further achieved. The first fixing part 1152 is detachably connected with a bottom of the first housing 111 and/or the second housing 112, and the second fixing part 1153 is detachably connected with a side wall of the second housing 112. And in this embodiment, the bottoms of the first housing 111 and the second housing 112 are further provided with a notch (not numbered) for clamping and housing the first fixing part 1152. With this arrangement, when the first fixing part 1152 is housed in the notch, an outer surface of the first fixing part 1152 is flush with a bottom of the housing 11 or lower than the bottom of the housing 11, so as to facilitate a stable placement of the electric cutting tool 100 on a plane.

Figure 15:
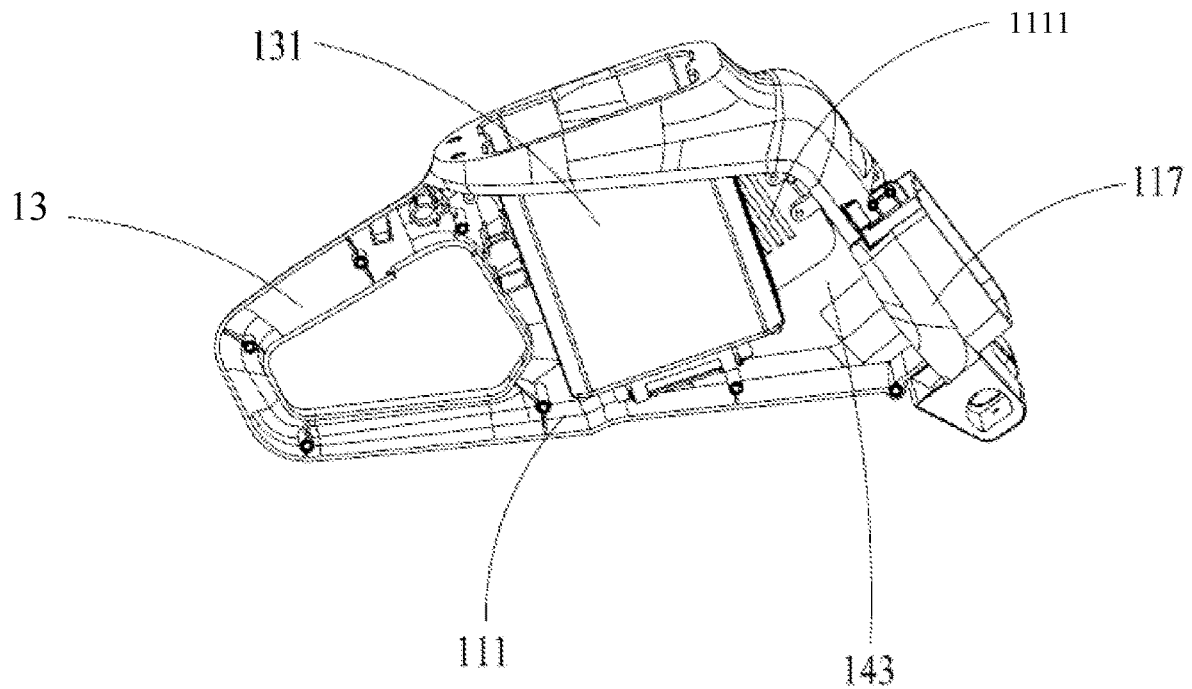
FIG. 15 is a disassembled schematic view of the first housing in FIG. 13.

Please refer to FIG. 13 through FIG. 15. The housing 11 is further provided with a base 116 arranged at a lower front end thereof, and the base 116 is configured to support the housing 11, so that the electric cutting tool 100 has a higher supporting strength. And in this embodiment, the first fixing part 1152 penetrates through the base 116 to be connected with the housing 11 for positioning. This arrangement may facilitate a connection and installation of the auxiliary handle 12 and the housing 11. The housing 11 is further formed with a cooling structure (not shown) for cooling the driving assembly 20 and the power supply assembly 60. The cooling structure includes the inlet 1111 arranged on the first housing 111, the outlet 1121 arranged on the second housing 112, and a cooling passage 143 connecting the inlet 1111 and the outlet 1121.

Figure 16:
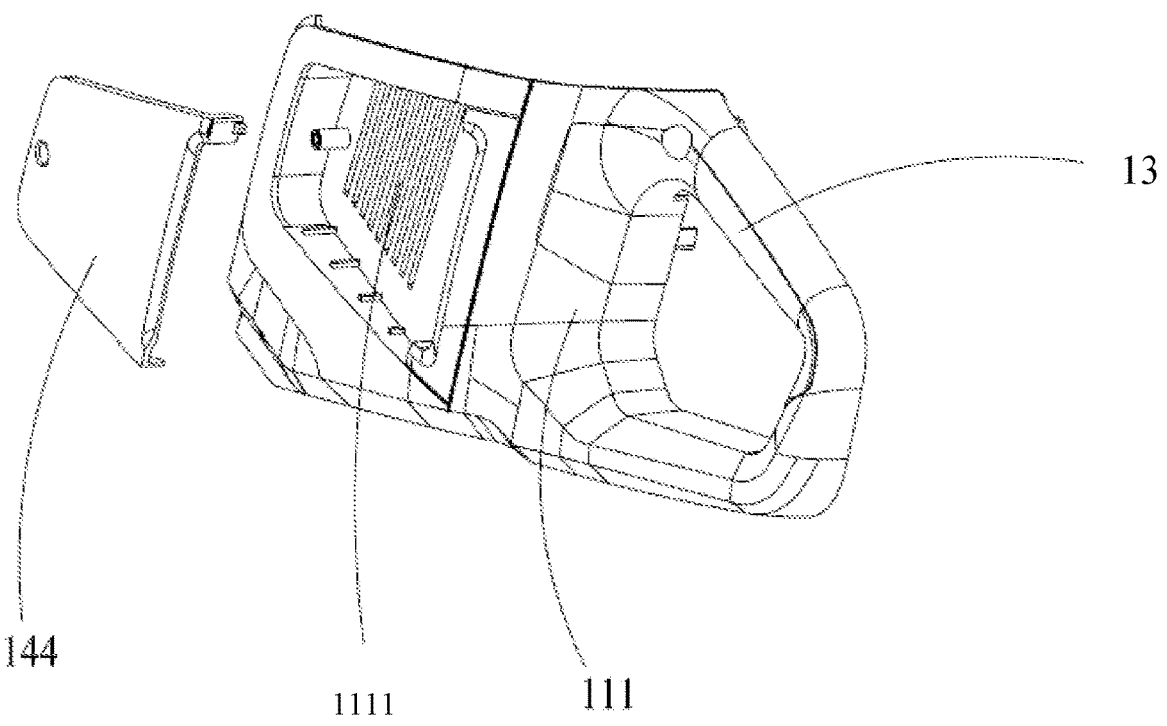
FIG. 16 is a disassembled schematic view of the first housing shown in FIG. 13 from another angle.

Please refer to FIG. 15 and FIG. 16. The inlet 1111 is arranged on a side wall of the first housing 111 and formed by an inward depression of the first housing 111. The inlet 1111 has a plurality of grid plates (not shown) arranged in parallel, which may effectively prevent large-sized sundries from entering the accommodating cavity 113 during use. An inlet baffle 144 is further arranged on an outside of the inlet 1111, and a filter component (not shown) is further arranged between the inlet baffle 144 and the inlet 1111. In this embodiment, the filter component may be configured as a filter layer for adsorbing debris such as dust and damp gas, and the filter layer is made of a material with filter holes, such as sponge, filter screen or gauze, etc. This arrangement may effectively prevent impurities from entering the accommodating cavity 113 of the housing 11, thereby enabling cooling air entering the cooling passage 143 through the inlet baffle 144, the filter component and the inlet 1111 to be clean, which may effectively protect a duration life of the driving assembly 20. The inlet baffle 144 is detachably connected with the first housing 111. With this arrangement, the filter component may be replaced by disassembling the inlet baffle 144, so as to prevent debris from clogging the filter holes of the filter component and ensure a filtering effect of the filter component.

Please refer to FIG. 14. The outlet 1121 is arranged on a side wall of the second housing 112 opposite to the first housing 111, and a size of the inlet 1111 is larger than that of the outlet 1121. This arrangement may effectively increase an amount of the cooling air entering the accommodating cavity 113 and ensure a heat exchange efficiency of the cooling structure. The outlet 1121 is arranged toward a side of the second housing 112 to prevent a position of an air outlet from facing the user and affecting the user's usage.

Please refer to FIG. 13 through FIG. 15. The cooling passage 143 is arranged around the power supply assembly 60 housed in the accommodating cavity 113, and a setting position of the cooling passage 143 passes through the power supply assembly 60 and the driving assembly 20 at the same time. This arrangement may ensure that the cooling air flowing through the cooling passage 143 is in full contact with the driving assembly 20 and the power supply assembly 60, which further improves the heat exchange efficiency of the cooling structure. The inlet 1111 is located in a middle of the first housing 111, and the outlet 1121 is located at a front end of the second housing 112, so that the cooling passage 143 is arranged in an "L" shape. With this arrangement, while ensuring a cooling efficiency of the cooling structure, the power supply assembly 60 may be guaranteed to have a small volume. Of course, in other embodiments of the disclosure, the cooling passage 143 may also be set in other shapes, as long as the cooling effect of the cooling structure is ensured. The cooling structure further includes an air collecting component 146 arranged in the cooling passage 143 and corresponding to the driving assembly 20. The air collecting component 146 is configured to collect the cooling air entering the cooling passage 143 through the inlet 1111, and enables the cooling air to fully contact with the driving assembly 20, so as to reduce a use temperature of the driving assembly 20.

Figure 17:
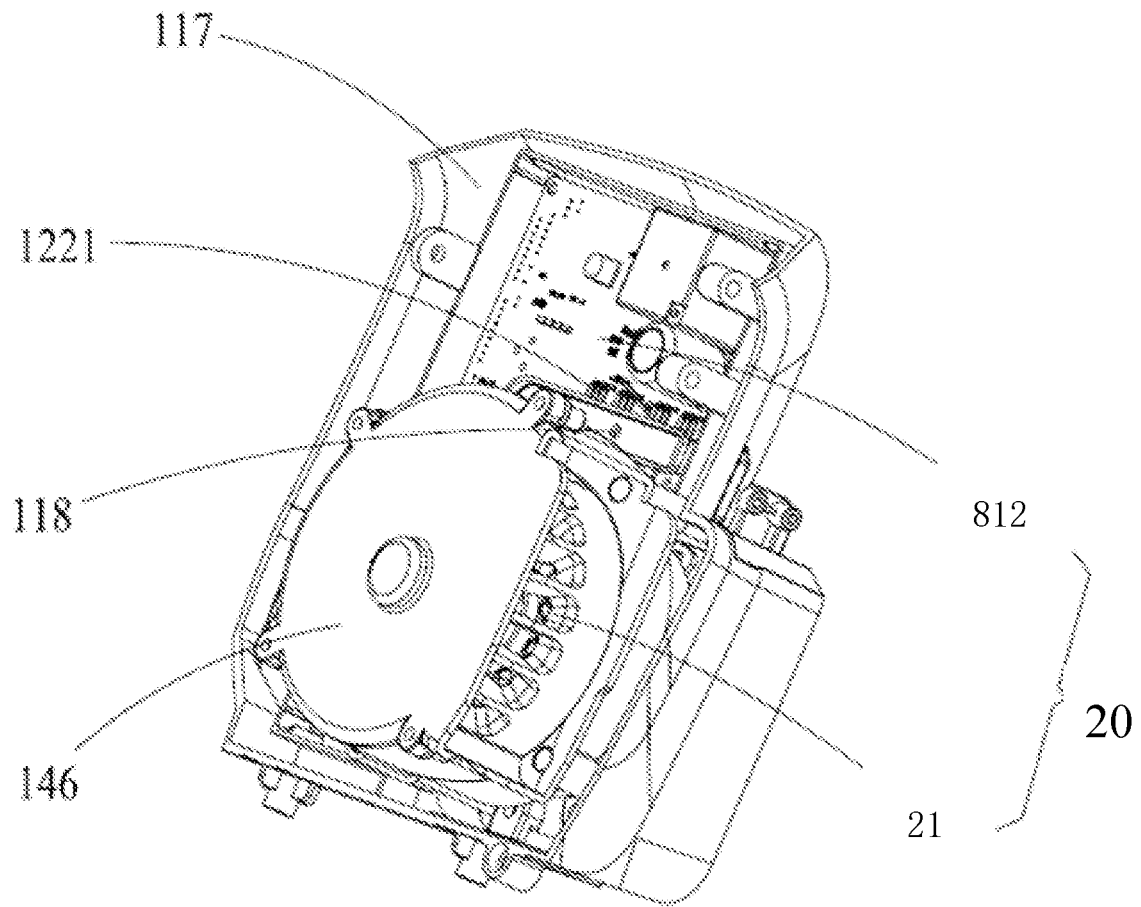
FIG. 17 is a schematic structural view of a third housing and a driving assembly in FIG. 13 when assembled.

Please refer to FIG. 14 and FIG. 17. The air collecting component 146 is detachably connected with the front end of the housing 11, and the housing 11 is further provided with a third housing 117 for connecting and fixing the air collecting component 146. The third housing 117 is fastened to the front ends of the first housing 111 and the second housing 112 to close the accommodating cavity 113 of the housing 11. With this arrangement, dust or sewage generated during a working process of the working assembly 200 may be prevented from entering the accommodating cavity 113 along a gap where the first housing 111 and the second housing 112 are clamped, which may affect a normal operation of the driving assembly 20 and the power supply assembly 60.

Please refer to FIG. 14 and FIG. 17. The driving assembly 20 penetrates the third housing 117, protrudes into the cooling passage 143, and is connected and positioned with the third housing 117. The air collecting component 146 covers a part of the driving assembly 20 housed in the accommodating cavity 113, and has an exhaust port 147 for exhausting air. In this embodiment, the exhaust port 147 is arranged toward the outlet 1121, so that the cooling air collected in the air collecting component 146 is led out through the outlet 1121 along the exhaust port 147. The driving assembly 20 includes the prime motor 21 connected with the front end of the housing 11, an electronic control unit for controlling the prime motor 21, and a fan 813 connected to the prime motor 21. Specifically, the electronic control unit may be a PCB board 812, the prime motor 21 is detachably connected with the housing 11, and the prime motor 21 is provided with a driving shaft (not numbered) that drives the working assembly 200 and the fan 813 at the same time. Specifically, one end of the driving shaft is drivingly connected with the working assembly 200, and the other end of the driving shaft is connected with the fan 813, and the fan 813 protrudes into the cooling passage 143. The air collecting component 146 covers on the fan 813 and the prime motor 21, and an air intake passage (not numbered) for air intake is formed between the air collecting component 146 and the third housing 117. At this time, the cooling air outside the electric cutting tool 100 may be driven by the fan 813 to flow through the power supply assembly 60 along the cooling passage 143 through the inlet 1111, and further enters the air collecting component 146 through the air intake passage between the air collecting component 146 and the third housing 117, so that the cooling air may sufficiently cool down the prime motor 21, and is finally discharged through the exhaust port 147 and the outlet 1121.

Please refer to FIG. 14. The PCB board 812 is fixed inside the housing 11, and the setting position of the cooling passage 143 passes through a fixed position of the PCB board 812. In the disclosure, the PCB board 812 is arranged on an inner side of the third housing 117 and is fixed in a form of gluing or screw connection. Specifically, the PCB board 812 is arranged around the prime motor 21, so that the PCB board 812 is arranged in a C shape, an L shape, a circle or a straight line, etc. The PCB board 812 is provided with a plurality of MOS transistors 1221 for controlling the electric cutting tool 100, and the plurality of MOS transistors 1221 are arranged close to the prime motor 21. With this arrangement, when the cooling air enters the air collecting component 146 through the air intake passage between the air collecting component 146 and the third housing 117, the PCB board 812 may be cooled at the same time.

Please refer to FIG. 14. The third housing 117 is a metal housing made of a metal housing material. At this time, the PCB board 812 may further achieve heat dissipation through the third housing 117. The third housing 117 is further provided with a plurality of heat dissipation ribs 118, which may effectively increase a heat dissipation area of the third housing 117 and further improve a heat dissipation capability of the electric cutting tool 100.

Please refer to FIG. 13 and FIG. 14. The power supply assembly 60 includes a battery cavity 131 arranged in the accommodating cavity 113 and a battery 132 inserted into the battery cavity 131. The battery cavity 131 is clamped between the first housing 111 and the second housing 112, and the battery cavity 131 is provided with a buckle part 133 that is buckled with the first housing 111 and the second housing 112. A bottom of the battery cavity 131 is provided with a plug base (not shown) for electrically connecting the driving assembly 20 with the battery 132, one side wall of the battery cavity 131 is arranged toward the inlet 1111, the cooling passage 143 extends around the battery cavity 131 and finally communicates with the air collecting component 146 and/or the outlet 1121 to achieve heat dissipation of the power supply assembly 60.

Please refer to FIG. 14. The electric cutting tool 100 of the disclosure is further provided with other control units, such as a switch unit 83 and the like, a specific structure of which is the same as or similar to the switch unit in the conventional art, so it is not repeated here. It should be understood that, although a description of well-known structures and technologies is omitted in the specification, it is only to avoid unnecessary confusion of a concept of the disclosure, and should not be directly understood that the disclosure is not provided with or does not include.

Please refer to FIG. 18. The electric cutting tool 100 includes the work assembly 200 for performing cutting work. It should be noted that the working assembly 200 may be detachably mounted, so the working assembly 200 may also be other types of working assemblies. Therefore, the following part of the specification will only describe the working assembly 200 in detail, and repeated parts will not be mentioned here.

Figure 19:
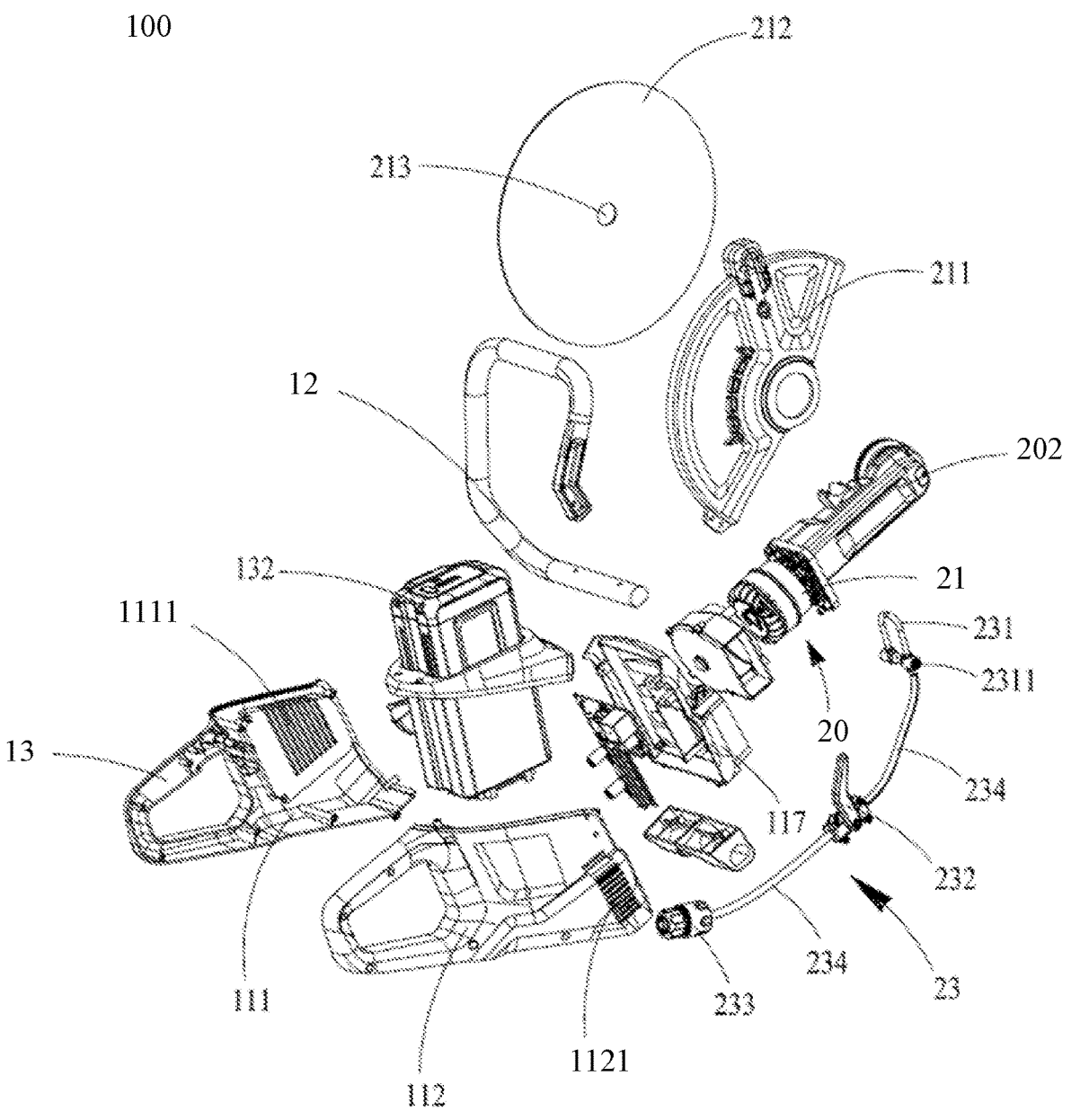
FIG. 19 is a disassembled schematic view of the electric cutting tool of FIG. 18.

Please refer to FIG. 19. The working assembly 200 of the disclosure is a cutter working assembly for performing cutting work, which includes a cutter unit 201, a transmission unit 202, and a spray unit 23 corresponding to the cutter unit 201.

Please refer to FIG. 18 and FIG. 19. The cutter unit 201 is configured to complete the corresponding cutting work under a driving action of the prime motor 21. The cutter unit 201 includes a protective cover 211 rotatably connected with an end of the transmission unit 202 in an extending direction, and a cutting blade 212 rotatably housed in the protective cover 211. The protective cover 211 is generally semicircular and may be rotated around the cutting blade 212. This arrangement, on the one hand, may prevent the user from touching the working assembly 200 by mistake when using the electric cutting tool 100, which causes harm to a body. On the other hand, the dust or waste liquid generated during a rotation of the cutting blade 212 may be effectively prevented from splashing backward.

Figure 20:
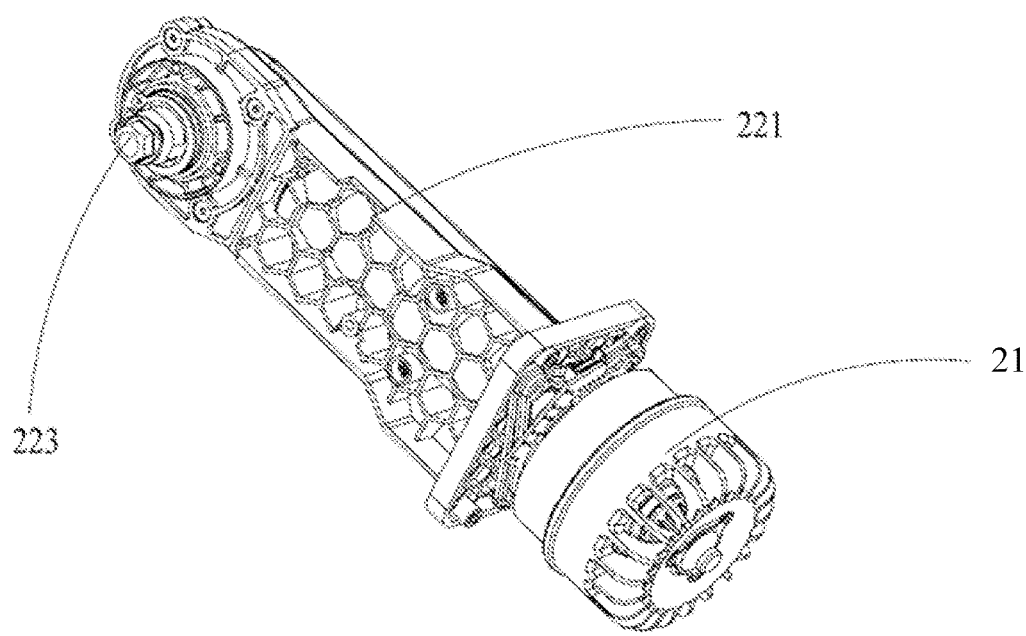
FIG. 20 is a schematic structural view of a transmission unit in FIG. 18 connected with a prime motor.
Figure 21:
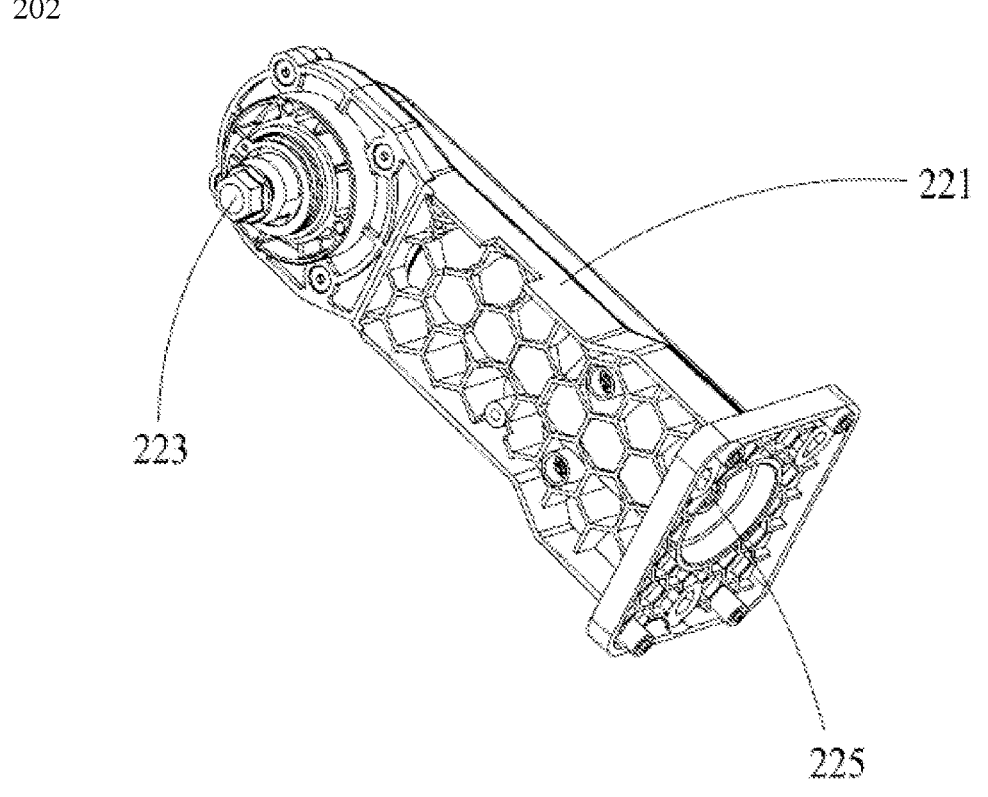
FIG. 21 is a schematic structural view of the transmission unit in FIG. 18.
Figure 22:
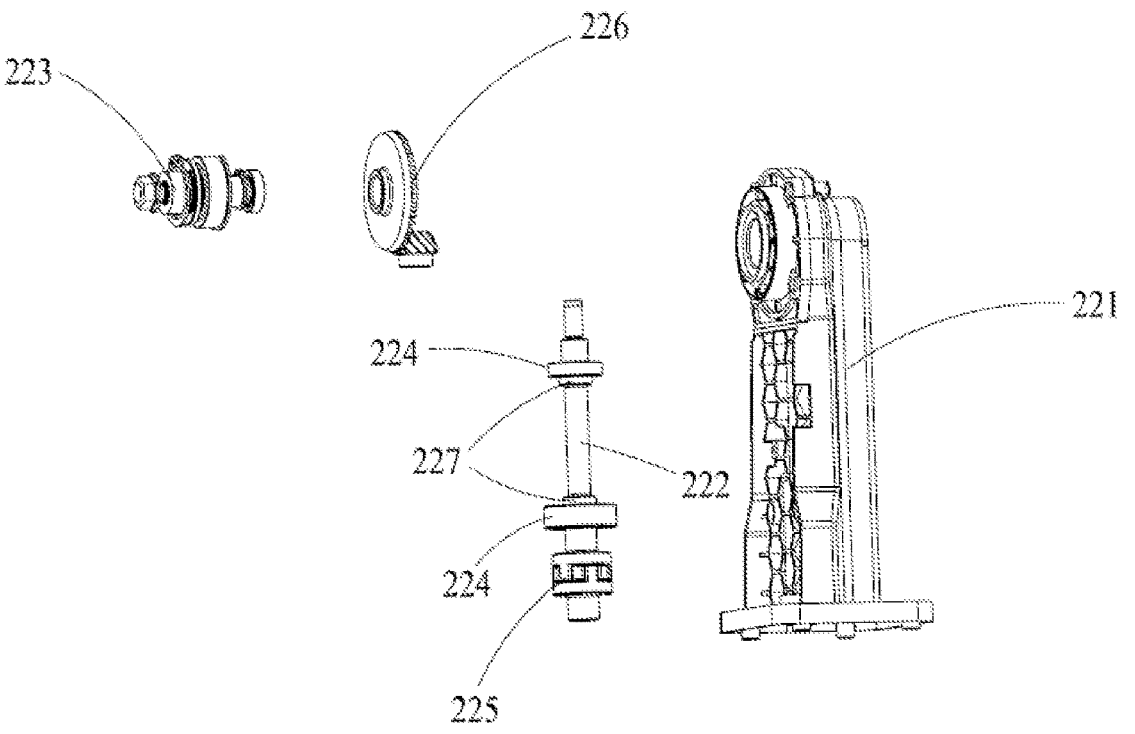
FIG. 22 is a disassembled schematic view from another angle of the transmission unit in FIG. 18.

Please refer to FIG. 20 and FIG. 22. The transmission unit 202 is configured for transmission connection between the prime motor 21 and the cutter unit 201. The transmission unit 202 includes a supporting arm 221 detachably connected with the third housing 117, a transmission shaft 222 housed in the supporting arm 221, and an output shaft 223 for connecting the cutting blade 212. The supporting arm 221 is hollow and the transmission shaft 222 is rotatably housed in the supporting arm 221 through a bearing 224. The driving shaft of the prime motor 21 penetrates the third housing 117, protrudes into the supporting arm 221 to be connected with the transmission shaft 222 housed in the supporting arm 221 in a transmission connection. In the disclosure, the end of the driving shaft in an extending direction is connected with the transmission shaft 222 through a coupling 225. In fact, since the driving shaft and the transmission shaft 222 are prone to vibration during a transmission connection, the coupling 225 in this embodiment is a flower-shaped coupling made of polyurethane material.

Figure 23:
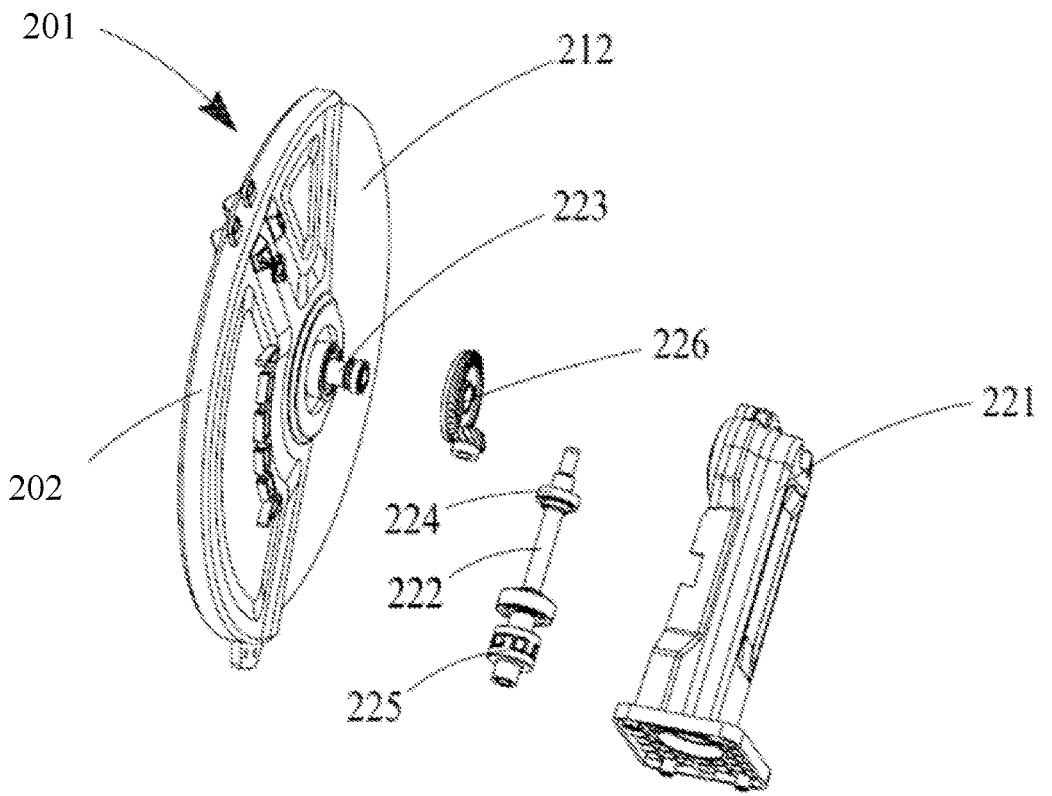
FIG. 23 is a disassembled schematic view when the transmission unit is connected with a cutter unit in FIG. 18.

Please refer to FIG. 23. Since the transmission unit 202 is in a transmission process, a ratio of radii of the transmission shaft 222 to the cutting blade 212 will directly affect a working time of the working assembly 200 and a stationarity of a cutting efficiency, a length of the transmission shaft 222 is, for example, from 80 mm to 200 mm, and a radius of the cutting blade 212 is, for example, from 100 mm to 200 mm.

Please refer to FIG. 23. An angle between the transmission shaft 222 and a horizontal plane will also directly affect a balance of a center of gravity of the electric cutting tool 100, and the angle between the transmission shaft 222 and the horizontal plane may be from 15° to 45°. The angle between the transmission shaft 222 and the horizontal plane may be 30°, so as to improve the balance of the electric cutting tool 100. The output shaft 223 is configured to connect the transmission unit 202 with the cutter unit 201. In the disclosure, one end of the output shaft 223 penetrates the protective cover 211 to be connected with the cutting blade 212 housed in the protective cover 211, and a center of the cutting blade 212 is provided with a connecting hole 213 (as shown in FIG. 19) for fixedly connecting the output shaft 223, which means that in the disclosure, the output shaft 223 penetrates through the protective cover 211 and the connecting hole 213 to be connected with the cutting unit 21. The other end of the output shaft 223 is connected with the other end of the transmission shaft 222 through a bevel gear 226, so that the output shaft 223 and the transmission shaft 222 are arranged at a certain angle to facilitate an observation of a cutting position of the cutting blade 212. The output shaft 223 in the disclosure is perpendicular to the transmission shaft 222 through the bevel gear 226.

Please refer to FIG. 22. Since the bevel gear 226 is affected by the cutting blade 212 in a process of connecting the transmission shaft 222 and the cutter unit 201, the bevel gear 226 exerts a force on the transmission shaft 222 along a direction of the transmission shaft 222 toward the driving shaft. Therefore, in order to prevent the aforementioned force from affecting the prime motor 21, the supporting arm 221 is further provided with a positioning component 227 for positioning the bearing 224. The positioning component 227 is arranged on the transmission shaft 322 and is a metal bolt (not numbered) for fixing a connection position of the bearing 224. Of course, in other embodiments of the disclosure, the positioning component 227 may also be other metal components or U-shaped components for clamping, which means that a specific structure and form of the positioning component 227 may be selected according to actual needs, which is not limited here.

Please refer to FIG. 19. Since a motor power, a rotation speed of the cutting blade 212 and a reduction ratio between the driving assembly 20 and the transmission unit 202 will directly affect the working time, working efficiency and energy consumption of the electric cutting tool 100 in the disclosure, in order to enable the electric cutting tool 100 to realize an efficient cutting, in the disclosure, a reduction gear ratio of the bevel gear 226 is from 2 to 6, the battery 132 is a lithium battery pack with a voltage of 60V-82V, and a power of the prime mover 21 is from 1000 W to 3500 W, so that a cutting speed of the cutting blade 212 may reach from 3500 rpm to 6000 rpm. The spray unit 23 is configured to connect an external water supply unit (not shown) to spray the cutter unit 201 in a working state, so as to cool the cutter unit 201 and prevent dust from splashing during the cutting process. In the disclosure, the spray unit 23 includes a spray component 231 attached to the cutter unit 201, a control valve 232 for controlling a spray state of the spray component 231, and an external connector 233 for connecting an external water supply unit. The spray component 231, the control valve 232 and the external connector 233 are connected through a pipeline 234. The spray component 231 is arranged in a "U" shape and is clamped on an edge of the protective cover 211. Both ends of the spray component 231 are provided with nozzles 2311, and the nozzles 2311 are clamped on both sides of the cutting blade 212 by the spray component 231 to spray both sides of the cutting blade 212 at the same time. The control valve 232 is communicated with the spray component 231 through the pipeline 234, and the control valve 232 is arranged on a side of the second housing 112, which may facilitate the user to control the spray unit 23. The external connector 233 is used to connect the external water supply unit. In the disclosure, the external connector 233 is further connected with the control valve 232 through the pipeline 234, and the external connector 233 is detachably connected with the pipeline 234, which means that in the disclosure, the external connector 233 may be selected according to actual needs and a specific structure of the external water supply unit, which is not limited herein.

The electric cutting tool 100 of the disclosure is provided with the cooling structure formed in the housing 11, which ensures that the electric cutting tool 100 has a small volume, the driving assembly 20 and the power supply assembly 60 housed in the housing 11 may be effectively cooled, further enables the electric cutting tool 100 to be compact in structure, take up less space, and be convenient to operate. This arrangement effectively improves the working efficiency of the electric cutting tool 100, prolongs its duration life, and facilitates a popularization and use of the electric cutting tool 100.

The above description is only a preferred embodiment of the disclosure and an explanation of the applied technical principles. Those skilled in the art should understand that a scope involved in this disclosure is not limited to a technical solution formed by a specific combination of the above technical characteristics, it should also cover other technical solutions formed by any combination of the above technical characteristics or their equivalent characteristics without departing from the concept of the disclosure.

What is claimed is:

1. An electric cutting tool, comprising:
   a working assembly,
   a driving assembly, connected with the working assembly and driving the working assembly to operate, and
   a housing, at least part of the driving assembly being arranged inside the housing,
   wherein,
   the housing comprises an inlet and a magnetic component arranged at the inlet;
   the housing is provided with an inlet cover matched with the inlet, and an inlet passage is formed between the inlet cover and the housing.

2. The electric cutting tool according to claim 1, wherein the housing comprises an accommodating cavity, at least part of the driving assembly is housed in the accommodating cavity, and the magnetic component is arranged on a side of the housing away from the accommodating cavity.

3. The electric cutting tool according to claim 1, wherein the housing is provided with a fixing groove, and the magnetic component is arranged in the fixing groove.

4. The electric cutting tool according to claim 1, wherein a ferromagnetic component is arranged on the housing, and the magnetic component is adsorbed on the ferromagnetic component.

5. The electric cutting tool according to claim 1, wherein the magnetic component is located on a side of the inlet facing away from the working assembly.

6. The electric cutting tool according to claim 1, wherein the inlet passage comprises an inlet end communicated with the outside and an outlet end communicated with the inlet, and the inlet end is located on a side of the inlet cover away from the working assembly.

7. The electric cutting tool according to claim 6, wherein the magnetic component is arranged between the inlet end and the outlet end.

8. The electric cutting tool according to claim 1, wherein the magnetic component is arranged on a side of the inlet cover facing the inlet.

9. The electric cutting tool according to claim 1, further comprising a shield assembly, wherein
   the shield assembly comprises a shield and a positioning mechanism matched with the shield, the shield is arranged at least partially over the working assembly and surrounds at least a portion of the working assembly.

10. The electric cutting tool according to claim 9, further comprising a lighting assembly, wherein the lighting assembly is arranged on the shield, and the lighting assembly is configured to illuminate an area to be cut.

11. The electric cutting tool according to claim 10, wherein the lighting assembly comprises a first lighting lamp and a second lighting lamp, the first lighting lamp and the second lighting lamp are respectively located on both sides of a plane where the working assembly is located, and a light emitted by the first lighting lamp and a light emitted by the second lighting lamp form an overlapping area directly below the working assembly.

12. The electric cutting tool according to claim 11, wherein the shield comprises a first protective wall, a second protective wall and a connecting wall, the first protective wall and the second protective wall are arranged in parallel with the working assembly, the connecting wall connects the first protective wall with the second protective wall, and the first protective wall and the second protective wall are located on two sides of the working assembly respectively.

13. The electric cutting tool according to claim 12, wherein the lighting assembly further comprises a lamp base to mount the first lighting lamp and the second lighting lamp, the lamp base is straddled on the connecting wall, and the first lighting lamp and the second lighting lamp are respectively located on both sides of the plane where the working assembly is located.

14. The electric cutting tool according to claim 13, wherein the lamp base is provided with a dust-proof cover matched with the first lighting lamp and the second lighting lamp.

15. The electric cutting tool according to claim 11, further comprising an auxiliary handle, wherein the first lighting lamp and the second lighting lamp are mounted on the auxiliary handle, and the first lighting lamp and the second lighting lamp are located on both sides of the plane where the working assembly is located.

16. The electric cutting tool according to claim 1, wherein the housing at least comprises a first housing, a second housing clamped with each other, and an accommodating cavity formed by the first housing and the second housing together.

17. The electric cutting tool according to claim 16, further comprising a power supply assembly, wherein the driving assembly is housed in the accommodating cavity to drive the working assembly, and the power supply assembly comprises a battery cavity arranged in the accommodating cavity and a battery inserted in the battery cavity.

18. The electric cutting tool according to claim 17, wherein a cooling structure configured to cool the driving assembly and the power supply assembly is arranged in the housing, the cooling structure comprises the inlet arranged on the first housing, an outlet arranged on the second housing, and a cooling passage connecting the inlet with the outlet, the driving assembly comprises a fan protruding into the cooling passage, and the cooling passage is configured to allow cooling air to flow therein via the air inlet, flow through the power supply assembly and the driving assembly and be discharged from the outlet.

19. The electric cutting tool according to claim 17, wherein the working assembly comprises a cutting unit for cutting operations, the working assembly further comprises a transmission unit, the transmission unit comprises a supporting arm, an output shaft and a transmission shaft, the output shaft and the transmission shaft are housed in the supporting arm, a first end of the transmission shaft is provided with a coupling in transmission connection with a driving shaft of the driving assembly, and a second end of the transmission shaft is connected with the output shaft through a gear, the output shaft is connected with a cutter unit, and an extension direction of the output shaft and an extension direction of the transmission shaft are arranged at an angle.

* * * * *